United States Patent [19]
Sato et al.

[11] Patent Number: 5,430,843
[45] Date of Patent: Jul. 4, 1995

[54] DATA TRANSMISSION SYSTEM AND METHOD FOR TRANSMITTING DATA HAVING REAL-TIME AND NON-REAL-TIME CHARACTERISTICS

[75] Inventors: Tadashi Sato, Tama; Kimito Idemori, Fuchu, both of Japan

[73] Assignee: Kabushiki Kaisha Toshiba, Kanagawa, Japan

[21] Appl. No.: 279,868

[22] Filed: Jul. 26, 1994

Related U.S. Application Data

[63] Continuation of Ser. No. 632,660, Dec. 27, 1990, abandoned, which is a continuation of Ser. No. 156,423, Feb. 16, 1988, abandoned.

[30] Foreign Application Priority Data

Feb. 16, 1987 [JP] Japan .................. 62-31408

[51] Int. Cl.⁶ .................. G06F 13/42
[52] U.S. Cl. .................. 395/200; 364/940.81; 364/942; 364/942.03; 364/942.1; 364/DIG. 2
[58] Field of Search .......... 395/200, 275, 325; 364/DIG. 1, DIG. 2

[56] References Cited

U.S. PATENT DOCUMENTS

| | | | |
|---|---|---|---|
| 4,354,229 | 10/1982 | Davis et al. | 364/200 |
| 4,509,117 | 4/1985 | Korowitz | 364/200 |
| 4,511,958 | 4/1985 | Funk | 364/200 |
| 4,517,644 | 5/1985 | Hamada et al. | 364/200 |
| 4,556,939 | 12/1985 | Read | 364/200 |
| 4,571,672 | 2/1986 | Hatada et al. | 364/200 |
| 4,646,232 | 2/1987 | Chang et al. | 364/200 |
| 4,739,510 | 4/1988 | Jeffers et al. | 380/15 |
| 4,748,617 | 5/1988 | Drewlo | 370/85 |
| 4,868,866 | 9/1989 | Williams, Jr. | 380/49 |
| 5,109,379 | 4/1992 | Kume et al. | 370/94.3 |

*Primary Examiner*—Thomas G. Black
*Assistant Examiner*—Maria N. Von Buhr
*Attorney, Agent, or Firm*—Finnegan, Henderson, Farabow, Garrett & Dunner

[57] ABSTRACT

A system for transmitting data between a plurality of linked stations within a cycle period defined by successive transmissions of a header signal indicating the start of a data transmission, only one station having a right to transmit data at a given time, the data including a first portion for which real-time characteristics are required, and a second portion for which real-time characteristics are not required. Each station includes a transmission circuit for transmitting the header signal and the data to another station, a receiver circuit for receiving the header signal and the data from another station, and a control circuit for assigning the right to transmit data serially to each station in a prescribed order two times within each cycle period and for transmitting the first portion of the data separately from the second portion of the data. The first portion of the data is transmitted the first time that the right to transmit data is assigned to the station.

19 Claims, 4 Drawing Sheets

DATA TRANSMISSION SYSTEM AND METHOD FOR TRANSMITTING DATA HAVING REAL-TIME AND NON-REAL-TIME CHARACTERISTICS

This application is a continuation of application Ser. No. 07/632,660, filed Dec. 27, 1990, now abandoned, which was a continuation of application Ser. No. 07/156,423, filed Feb. 16, 1988 and now abandoned.

BACKGROUND OF THE INVENTION

1. Field of the Invention

This invention relates to a data transmission system and more particularly to a system using an implicit token passing method.

2. Description of the Related Art

The LANs (local Area Networks) which have been developed in recent years are now rapidly being standardized. Typical methods that have been developed include a CSMA/CD (Carrier Sense Multiple Access with Collision Detection) method (IEEE standard 802.3), a token bus method (802.4), and a token ring method (802.5). The CSMA/CD method was the first of these to be applied to practical use, and it has a high level of reliability. However, there is a problem with the CSMA/CD method, since collisions between transmission frames from different transmission nodes sometimes occur, and therefore response is not guaranteed. In particular, the CSMA/CD method is not suitable for FA (Factory Automation) or LA (Laboratory Automation), where real-time characteristics are essential.

A proposal was made recently to overcome this defect in the CSMA/CD method by adding real-time characteristics through the use of the implicit token passing method (Japanese Patent Application No. 58176385). An explanation of this conventional implicit token passing method is given below. FIG. 1 (Prior Art) shows how a data transmission system is configured such that all the stations 20 (Nos. 1–N) are connected to a common transmission line 1. For the sake of convenience, a bus-type system is illustrated here, but there is no restriction as to the topology of the transmission network form. FIG. 2 is a time chart, provided to explain the working of this system. One of the stations (Nos. 1–N), acting as the master station, notifies the other stations that a transmission cycle is beginning by outputting a frame header (FH) 21, which is an indicator to start a transmission cycle. In the example shown in FIG. 2, No. 1 is the master station. Each station incorporates a slot counter. This slot counter is incremented every time its station receives a frame 23 on the transmission line. This slot counter is reset when a frame header (FH) 21 is received. When the value of the count in this slot counter becomes one less than the number assigned to each station, the transmission of frames (F) 23 of the preceeding station has been completed and after the elapse of a time-space 25 between the frames, each station is allowed to transmit its own data. When the last station (No. N) has finished transmitting its frames (F) 23, the master station (No. 1) moves to the next transmission cycle by transmitting another frame header (FH) 21. The adoption of this implicit token passing method provides the CSMA/CD method with improved real-time characteristics.

There is still a problem, however, in that real-time characteristics deteriorate with the conventional system as described above if the number of stations is increased. In FA and LA systems, the data includes a portion for which real-time characteristics are required, and a portion for which such characteristics are unnecessary. Therefore, if attempt is made to transmit all the data without discrimination, it is not possible to ensure correct response for the portion of data for which real-time characteristics are required as the amount of data increases. This tendency is increasingly marked when there are many stations, and transmission cycles are therefore longer.

SUMMARY OF THE INVENTION

It is an object of this invention to maintain the real-time characteristics of a data transmission system.

Another object of the invention is to make it possible to transmit data for which real-time characteristics are required separately from data for which the real-time characteristics are not required, during one cycle period.

The foregoing objects are achieved according to the present invention by providing a system for transmitting data between a plurality of linked stations within a cycle period defined by successive transmissions of a header signal indicating the start of a data transmission, only one station having a right to transmit data at a given time, the data including a first portion for which real-time characteristics are required, and a second portion for which real-time characteristics are not required. Each station includes transmission means for transmitting the header signal and the data to another station, receiver means for receiving the header signal and the data from another station, and control means for assigning the right to transmit data serially to each station in a prescibed order two times within each cycle period and for transmitting the first portion of the data separately from the second portion of the data. The first portion of the data is transmitted the first time the right to transmit data is assigned to the station.

Additional objects and advantages will be obvious from the description which follows, or may be learned by the practice of the invention.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
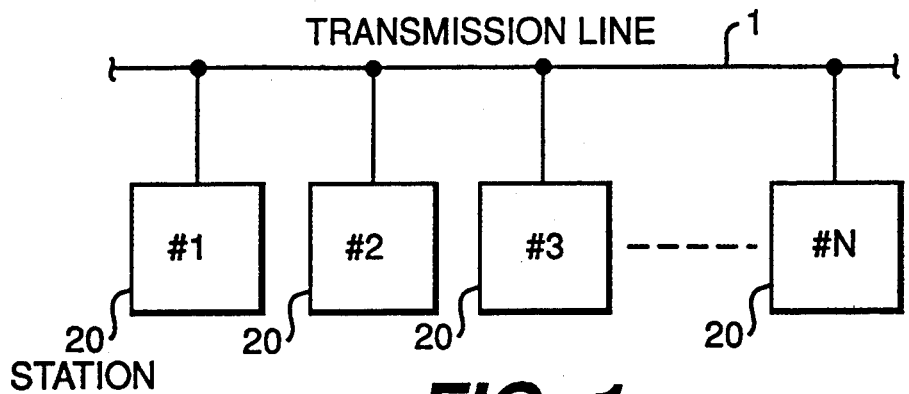
FIG. 1 (Prior Art) is a block diagram illustrating a typical bus-type data transmission system, FIG. 2 (Prior Art) is a time chart showing operations of a conventional implicit token passing method.
Figure 2:
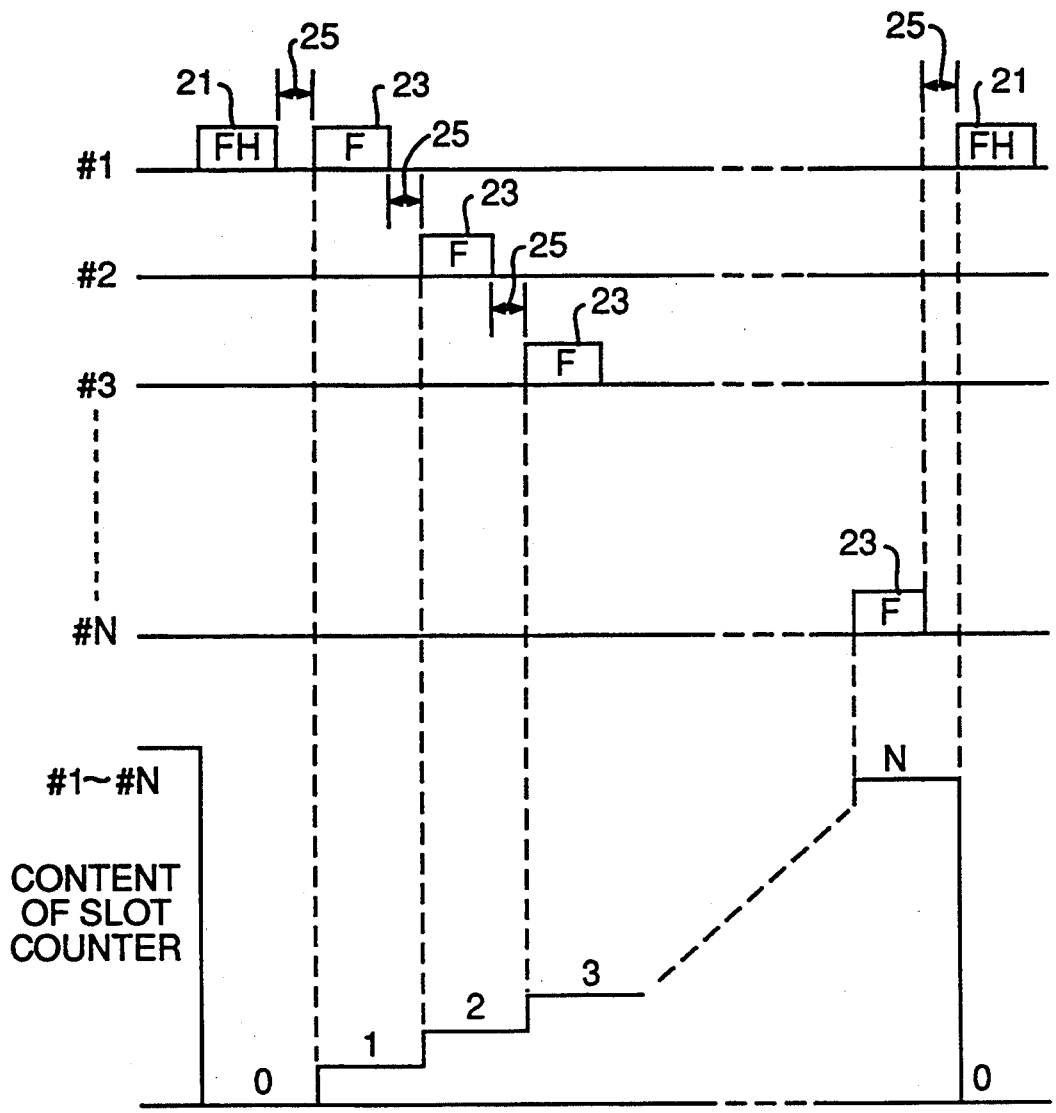

Referring now to the drawings, wherein like numerals designate identical or corresponding parts throughout the several views, various embodiments of the present invention will be described.

Figure 3:
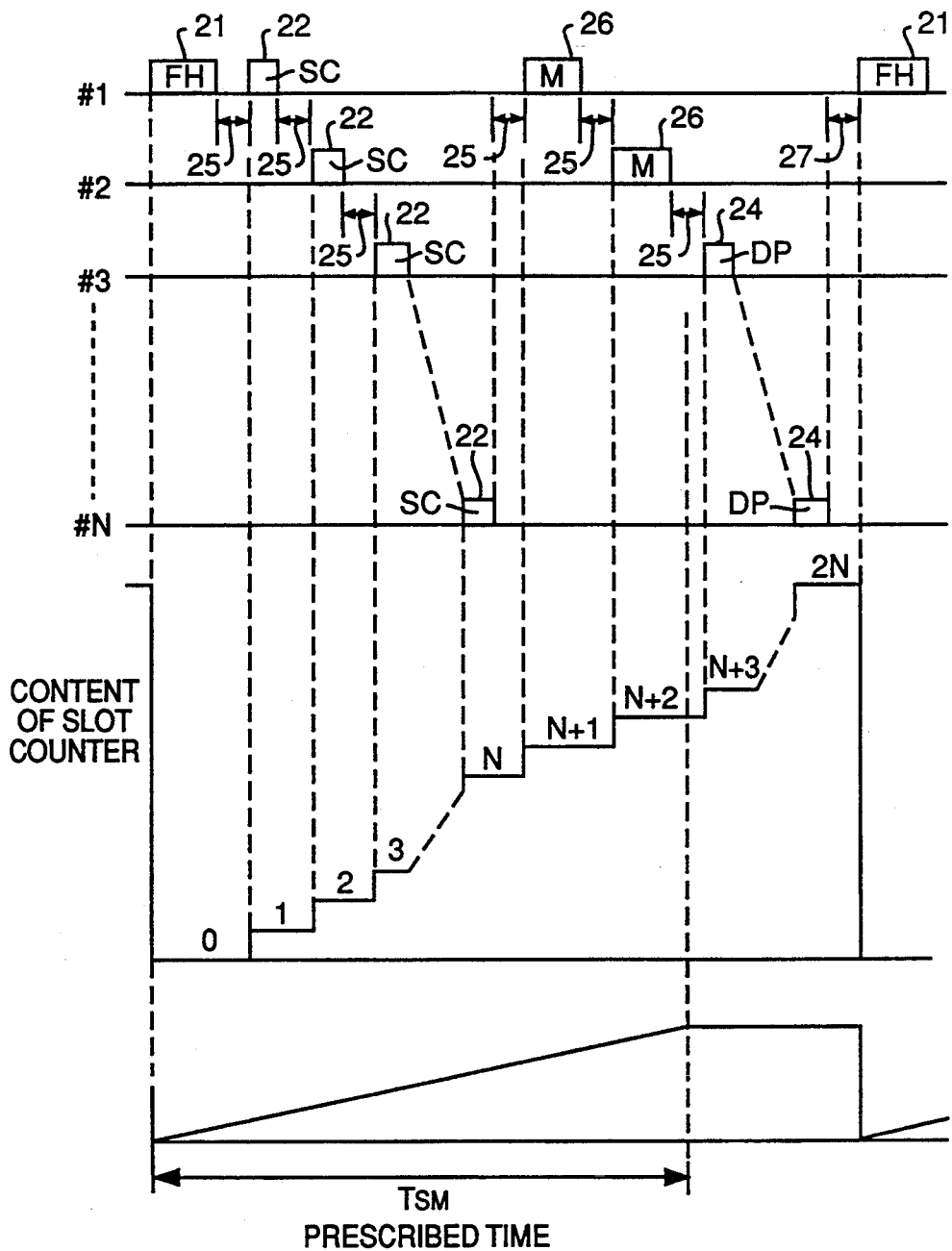
FIG. 3 is a time chart illustrating operations of an embodiment of the invention.

FIG. 3 shows an embodiment of the data transmission method of the invention. Station No. 1 is the master station in a transmission system composed of N data transmission apparatus (stations) 20. This station No. 1 transmits a frame header (FH) 21, which is the command for the start of a transmission cycle and which resets the content of the counting means (slot counter) provided in each station. Thereafter, the content of each counting means is incremented each time a frame is received. The right to transmit data is determined by the content of the counting means and is therefore passed sequentially from station to station. FIG. 3 illustrates the case where station Nos. 1, 2, 3, ... N are set to 0, 1, 2, ... N−1, and real-time scan data frames (SC) 22 have been transmitted in the order "station No. 1, 2, 3, ... N". When the content of each counting means has been incremented by the SC 22 transmitted by station No. N to the maximum station number N, the right to transmit data is assigned back to station No. 1 after the elapse of a prescribed time interval from the moment of completion of the above-mentioned one-series of frame transmissions. Thereafter, a second series of transmissions is begun, in the order station No. 2, 3, ... N.

When this second series of transmissions has been completed, the content of the counting means has reached 2N, and this causes the master station to transmit frame header (FH) 21 again, resetting the counting means of all the stations and serving as the command for the next transmission cycle. Thus each station has two transmission opportunities in each transmission cycle. In a system configured as shown in FIG. 1 but using the method and apparatus of the present invention, station Nos. 1, 2, 3 ... N are given the right to transmit data for a second time when the content of the counting means (slot counters) is N, N+1, N+2, ... 2N−1, and station Nos. 1 and 2 have transmitted non-real-time message data frames (M) 26.

Each station is provided with a timer which starts a time count on the receipt of frame header (FH) 21. When a prescribed time TSM, which is determined by real-time characteristics corresponding to the data transmission system, has elapsed, a station is inhibited from transmitting its own data. When a station is given the right to transmit data, it transmits a short dummy frame (DP) 24 instead of the data frame. In the example shown in FIG. 3, station Nos. 3–N have transmitted DP 24. In this way real-time and non-real-time data can be transmitted separately during one transmission cycle without impairing the real-time characteristics.

Figure 4:
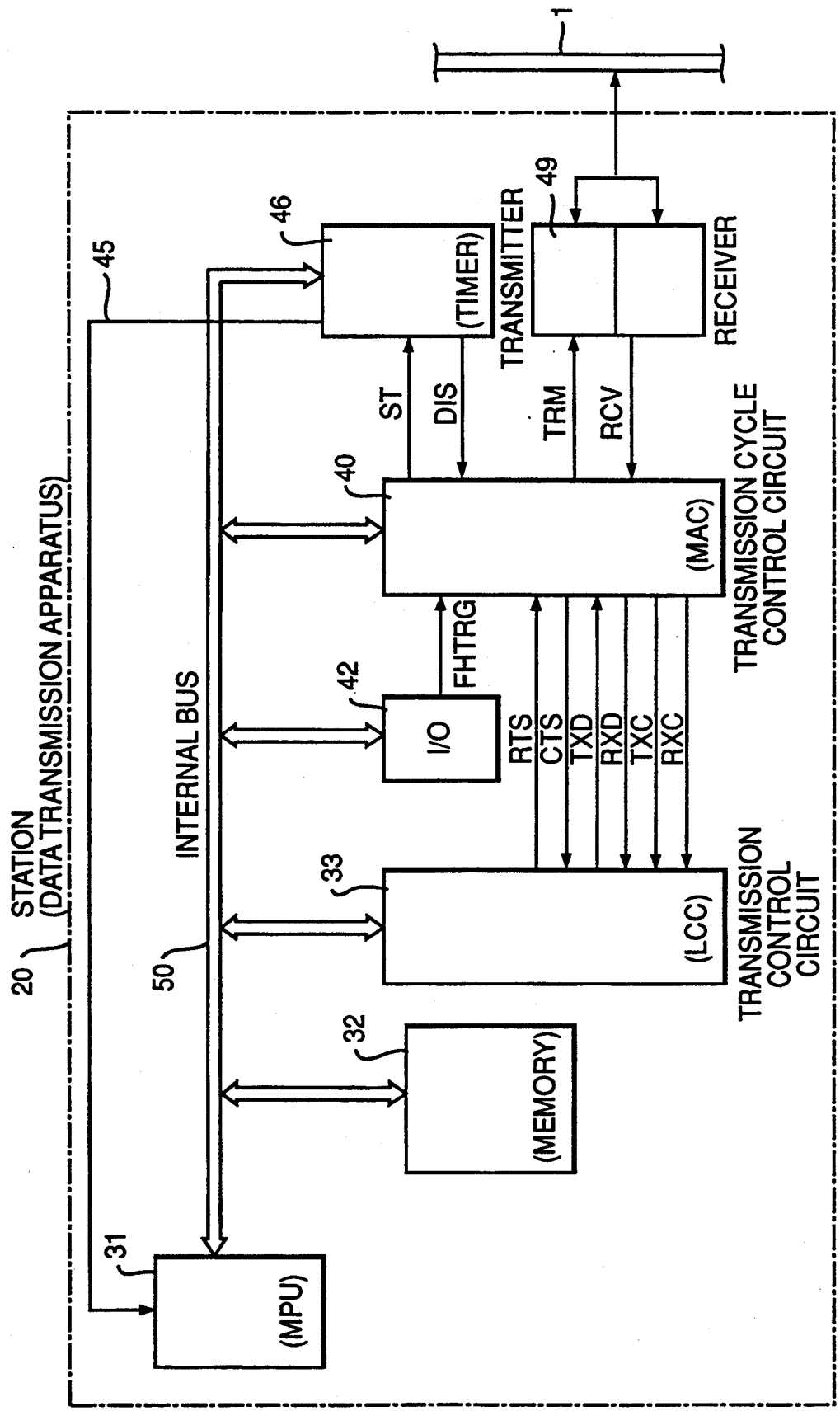
FIG. 4 is a block diagram illustrating an embodiment of a station according to the invention.

FIG. 4 shows an embodiment of the station (data transmission apparatus) of the invention, made up of the following elements. Each station includes a microprocessor (MPU) 31 for controlling the operation of the station, and memory 32, including a ROM containing a control program and a RAM in which primary data is stored. A transmission control circuit (LCC) 33 controls the IEEE 802.3 data link, and a transmission cycle control circuit (MAC) 40, connected to LCC 33, puts into effect the implicit token passing method. An I/O port 42 outputs a frame header output request signal FHTRG to MAC 40, and a programmable timer (TIMER) 46 starts to count on receipt of the signal ST indicating the end of the first transmission. When the prescribed time has elapsed, the timer outputs a signal DIS inhibiting transmission and also outputs at the same time an interrupt signal 45 to MPU 31. A transmitter-receiver (TR) 49 links transmission line 1 and MAC 40 by converting or inverting transmitted signal TRM and received signal RCV. MPU 31, memory 32, LCC 33, I/O port 42, MAC 40 and programmable timer 46 are linked by an internal bus 50.

Figure 5:
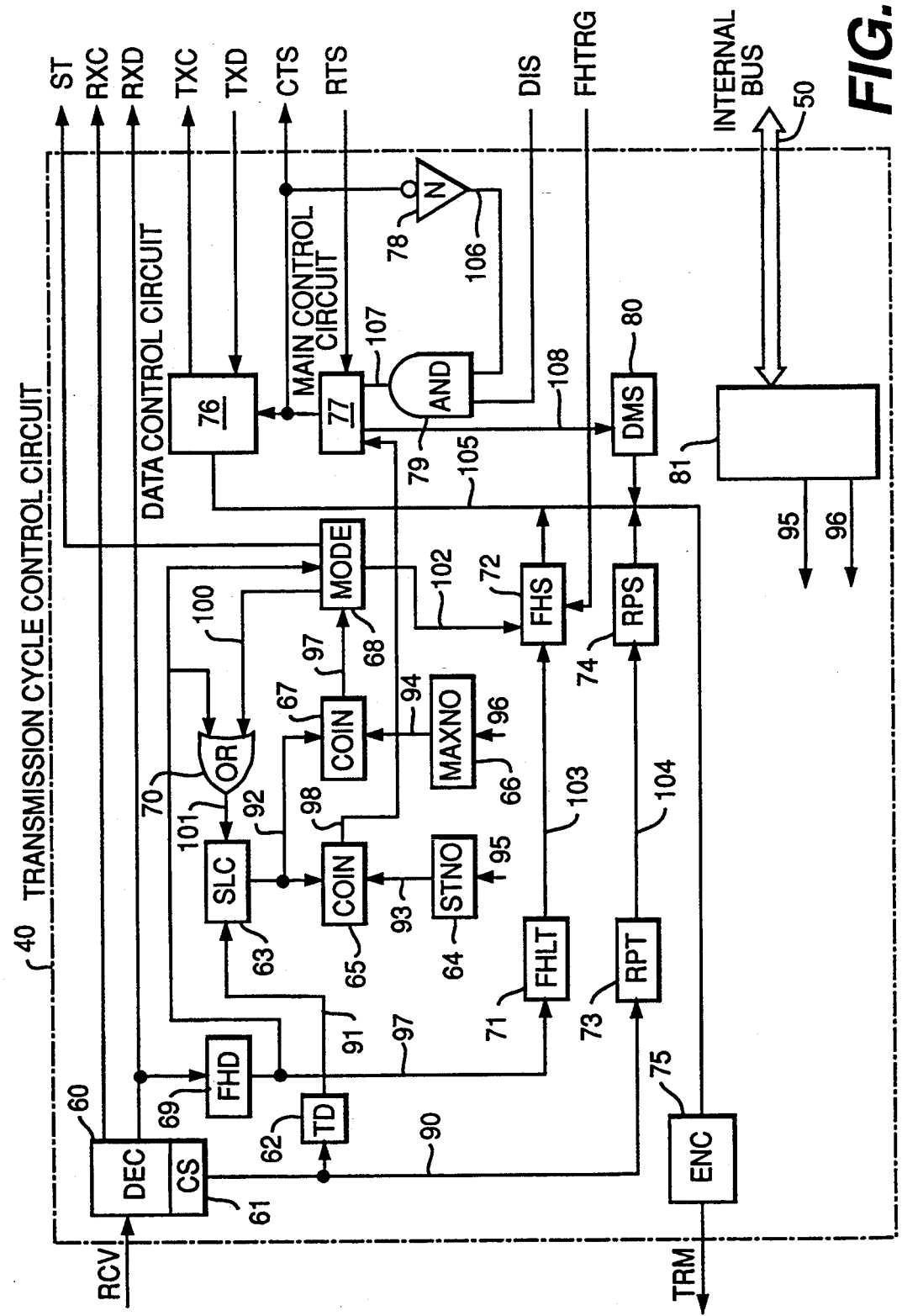
FIG. 5 is a detailed block diagram illustrating the transmission cycle control circuit 40 in FIG. 4.

FIG. 5 shows the internal construction of transmission cycle control circuit MAC 40. MAC 40 includes a decoder (DEC) 60, which converts the codes of received signal RCV and outputs a received clock RXC and received data RXD. A detection circuit (CS) 61 detects the received signal RCV. An effective length detection decision circuit (TD) 62 decides by means of detection signal 90 the presence or absence of a frame. A slot counter (SLC) 63 counts the number of frames by means of the output 91 of TD 62, and a coincidence detection circuit (COIN) 65 compares the content of SLC 63 with that of a holding circuit (SNTO) 64 to determine if a given number is set and thereby detects the timing of transmission for its own station. A coincidence detection circuit (COIN) 67 compares the content of SCL 63 with that of a holding circuit (MAXNO) 66 to determine if the total number of all stations is set. A mode change detection circuit (MODE) 68 outputs above-mentioned signal ST when a signal is received from COIN 67. A frame header detection circuit (FHD) 69 detects the frame header from received data RXD, and an OR circuit 70 resets SLC 63 by the logical sum of signals 97 and 100 output by FHD 69 and MODE 68. A timer (FHLT) 71 detects that the absence of the frame header has continued for a prescribed time, and a frame header send circuit (FHS) 72 sends the frame header when the station is functioning as a master station. A substitute frame send timer (RPT) 73 detects when there has been no frame for a prescribed time, and a substitute frame send circuit (RPS) 74 sends a substitute frame in response to the output of RPT 73 when the station is functioning as a master station. An encoder (ENC) 75 encodes sent data, and a data control circuit 76 sends transmission clock TXC to LCC 33 and also receives transmission data TXD and outputs this as send data. A main control circuit 77 controls transmission permission CTS or dummy frame send command 108 on the basis of transmission request RTS received from LCC 33 after the right to transmit data is established by means of coincidence signal 98 from COIN 65. A dummy frame send circuit (DMS) 80 sends a dummy frame in response to dummy frame send command 108. An internal port 81 allows the setting/state to be read from MPU 31 via an internal bus 50.

The frames used in the embodiment described above are explained below.

(a) Frame Header (FH)

This is the signal which is the command to start a transmission cycle.

(b) Dummy Frame (DP)

This is the signal which is sent when there is no data to transmit, or else programmable timer 46 has reached its limit, activating transmission inhibit signal DIS.

(c) Substitute Frame

This is the signal sent as a substitute by the master station when the station which should transmit is unable to do so because of a malfunction or any other reason.

An explanation follows of the working of a station in this embodiment.

(a) Initialization

When the stations are started up, MPU 31 sets the order of transmission for each station and the maximum value that this order of transmission can have in holding circuits 64 and 66, via internal port 81. At the same time it sets in programmable timer 46 the prescribed time TSM for which transmission is to be permitted.

(b) Command to Start Transmission Cycle (Function of Master Station)

Each station is provided with the capability of functioning as a master station. When MAC 40 has started up and the prescribed period of time has elapsed without a frame header being received, FHLT 71 detects this and causes a frame header ordering the start of a transmission cycle to be sent from FHS 72. The delay time of FHLT 71 is set at a slightly different value in each station, the stations with the shorter set times have priority in operation.

(c) Start of First Transmission

The SLC 63 in each station is reset when the station receives the frame header, and the station which is first in order for transmission obtains the right to transmit by means of signal 98 from COIN 65. If this station has data for transmission, this transmission data is output from data control circuit 76, while if the station has no data for transmission, a dummy frame is output from DMS 80.

Thereafter, the SLC 63 of each station is incremented by signal 91 each time a transmission frame is received, so that the stations in which the content of SLC 63 coincides with that of STNO 64 acquire the right to transmit, and begin transmitting, in succession.

When a station has obtained the right to transmit, main control circuit 77 activates transmission control signal CTS if transmission request signal RTS is active, or activates dummy frame send command signal 108 if transmission request signal RTS is non-active. By this means, when there is data to be transmitted, LCC 83 outputs transmission data TXD in sync with transmission clock TXC, sending it via data control circuit 76. Circuit 76 controls the content of data to be transmitted. When there is no data to be transmitted, a dummy frame is sent, as already described.

(d) Completion of First Transmission

When the right to transmit has been assigned from station to station in this way and the last station in the transmission sequence starts to transmit, the content of its SLC 63 coincides with that of MAXNO 66, COIN 67 outputs coincidence signal 97, and MODE 68 stores the fact that the first transmission has come to an end. MODE 68 also then outputs signal ST, starting up programmable timer 46, and signal 100, resetting SLC 63.

(e) Second Transmission

When the first transmission comes to an end, SLC 63 is reset, as already stated, and the second transmission begins in the same way as the first. Note, however, that non-real-time data is transmitted in this second transmission.

(f) Inhibition of Transmission During Second Transmission

When programmable timer 46 reaches its limit, signal DIS is activated, notifying inhibition of transmission to transmission cycle control circuit MAC 40. In this case signal DIS is ANDed with the signal obtained by inverting signal CTS, so that no frame is cut off in the course of transmission.

When it receives signal DIS, main control circuit 77 thereafter causes a dummy frame to be sent from DMS 80 when it is time for transmission, without activating signal CTS, even when signal RTS is active.

Also, when programmable timer 46 reaches its limit, it notifies MPU 31 by means of interrupt signal 45 that the transmission of data frames in that transmission cycle has been completed.

(g) Start of Next Transmission Cycle (Sending of Frame Header)

When MPU 31 receives interrupt signal 45 from programmable timer 46, after the lapse of sufficient time to allow for the processing of the data frames received during the current transmission cycle, the processing involved in completion of transmission requests, processing of requests to transmit relating to the next transmission cycle, and variations of processing time between stations, MPU 31 activates frame header output request signal FHTRG from I/O port 42. On the AND condition of signal 102 from MODE 68, indicating that the second transmission mode has finished, and of signal FHRTG, FHS 72 of the master station sends a frame header, as the command for the start of the next transmission cycle.

(h) Sending of Substitute Frame

When a station is not present or is out of action, and neither a data frame or dummy frame is output on the transmission line, a station which has detected by means of RPT 73 the absence of any frame on the transmission line for a given time (several times the time interval between frames), can function as a master station, sending a substitute frame by means of RPT 74.

In this embodiment, two transmission modes can be provided: a mode in which each station may always make a transmission once per transmission cycle; and a mode in which transmission will be made within a prescribed time.

In this embodiment, the scan data for determining the transmission times is transmitted in the first transmission, and programmable timer 46 is activated at the moment that the first transmission series has been completed. However, programmable timer 46 may equally well be activated on receipt of the frame header.

In addition, while in this embodiment the sending of the frame header was controlled by signal FHTRG from MPU 31, if there is not much variation in the processing time up to the start of the next transmission cycle, the frame header may be sent automatically after a fixed time from the end of the second transmission.

What is claimed is:

1. A system for transmitting data between N linked stations, where N is greater than 2, one of which is designated a master station, within a cycle period defined as a period between successive transmissions of a header signal indicating a start of data transmission by the N linked stations, only one station having a right to transmit data at a given time, the data transmitted by each station including a first portion for which real-time characteristics are required, and a second portion for which real-time characteristics are not required, each Mth station ($1 <= M <= N$) comprising:

transmission means for transmitting a header signal to another station when the station including the transmission means is designated a master station, and for transmitting ones of both the first and second data portions to another station, receiver means for receiving a header signal and first and second data portions transmitted from another station, and control means, coupled to the transmission means and the receiver means, for assigning to the station including the control means the right to transmit data in a cycle period, wherein the cycle period is divided into 2N time slots, and wherein data is transmitted by the control means only in at least one of a first time slot constituting an Mth time slot, and a second time slot constituting an N+Mth time slot within the cycle period and for transmitting the first portion of the data separate from transmission of the second portion of the data, the first portion being transmitted by the transmission means in the first time slot and the second portion being transmitted by the transmission means in the second time slot, wherein the control means is able to transmit data only in the first and second time slots.

2. The system of claim 1, wherein only one of the plurality of linked stations at a time is designated a master station, and wherein the control means includes means for generating the header signal when the right to transmit data is reassigned to the master station after the second portion of the data has been transmitted by the master station.

3. The system of claim 1, wherein the control means includes timer means for generating a timing signal after a prescribed time from a preselected starting point during a cycle period, and inhibition means for inhibiting the transmission of data from the station including the control means.

4. The system of claim 3, wherein the first and second data portions are transmitted in frames of predetermined size, and the control means also includes means responsive to the receiver means for permitting data transmission by the station only when a number of frames of predetermined size received by the station reaches a preset number and the prescribed time has not elapsed.

5. The system of claim 4, wherein the control means includes means for counting the number of frames received by the station after receipt of the header signal, and means for generating a permission signal when the number of frames counted by the counting means reaches the preset number.

6. The system of claim 5, wherein the control means also includes data control means for separating the data into the first portion and the second portion.

7. The system of claim 6, wherein the control means includes means for resetting the counting means in response to receipt of the header signal.

8. The system of claim 4, wherein the control means includes dummy frame means for determining when there is no data to be transmitted and for transmitting a frame containing no data both when the right to transmit data is assigned to the station and there is no data to be transmitted by the station, and when data transmission is inhibited by the inhibition means.

9. The system of claim 4, wherein the control means also includes substitute frame means responsive to the receiver means for determining when no frame is received by the receiver means for a predetermined time and for transmitting a frame containing no data when no frame is received by the receiver means for a predetermined time.

10. The system of claim 9, wherein the substitute frame means includes a frame timer for measuring the predetermined time and a substitute frame sending circuit responsive to the frame timer for generating the substitute frame.

11. A method of transmitting data, including a first portion for which real-time characteristics are required and a second portion for which real-time characteristics are not required, between a plurality of N linked stations, where N is greater than 2, the data being transmitted from one station to at least one other station within a cycle period defined as a period between successive transmissions of a header signal indicating a start of transmission, the method comprising the steps of:

assigning a right to transmit data by circulating the data transmission right among the N linked stations in a prescribed order;

dividing the cycle period into 2N time slots, such that each of the N linked stations is assigned a data transmission right during first and second time slots during each cycle period;

transmitting a header signal from a predetermined one of the N linked stations to others of the N linked stations, transmitting the first portion of the data from the predetermined one N linked station to each of the other N linked stations during the assigned first time slot of each cycle period, transmitting the second portion of the data from the predetermined one N linked station to each of the other N linked stations during the assigned second time slot of each cycle period and before an end of a prescribed time period after transmission of the first portion of the data and the header signal, and inhibiting by the predetermined one N linked station, after the end of the prescribed time period, further transmission of the second portion of the data to any other N linked station until completion of a current cycle period.

12. The method of claim 11, wherein the step of transmitting the first portion of the data includes the step of transmitting a frame containing no data when there is no data to be transmitted by the predetermined one N linked station when the right to transmit data during the first time slot is assigned to the predetermined one N linked station.

13. The method of claim 11, wherein the step of transmitting the second portion of the data includes the step of transmitting a frame containing no data when there is no data to be transmitted by the predetermined one N linked station when the right to transmit data during the second time slot is assigned to the predetermined one N linked station.

14. The method of claim 11, further including the step performed by the predetermined one N linked station, of receiving a frame containing one of the first and second transmitted data portions; wherein the steps of transmitting the first portion and the second portion of the data include the step of transmitting a frame containing no data when no frame is received by the predetermined one N linked station for a predetermined time.

15. The method of claim 11, wherein the step of inhibiting further transmission of the second portion of the data includes the step of transmitting a frame containing no data.

16. The method of claim 11, wherein the step of transmitting the second portion of the data includes the step of measuring a prescribed time from a time when the transmission of the first portion of the data is completed.

17. The method of claim 11, wherein the step of transmitting the header signal includes the step of measuring a prescribed time from a time when the header signal is transmitted.

18. A station in a system for transmitting data between N linked stations, where N is greater than 2, one of which is a master station, within a cycle period defined by successive transmissions of a header signal indicating a start of a data transmission by the N linked stations, only one station having a right to transmit data at a given time, the data transmitted by the station including a first portion for which real-time characteristics are required, and a second portion for which real-time characteristics are not required, the station comprising:

transmission means for transmitting a header signal to another station when the station including the transmission means is designated a master station, and for transmitting ones of both the first and second data portions to another station, receiver means for receiving a header signal and first and second data portions transmitted from another station, and control means, coupled to the transmission means and the receiver means, for assigning to the station the right to transmit data in the cycle period, wherein the cycle period is divided into 2N time slots such that each of the N linked stations is assigned a data transmission right during first and second time slots during each cycle period, the first portion of data being transmitted only in the first time slot and the second portion being transmitted by the transmission means only in the second time slot, wherein the control means is able to transmit data only in the assigned first and second time slots.

19. A system for transmitting data between N linked stations, where N is greater than 2, one of which is designated a master station, within a cycle period defined as a period between successive transmissions of a header signal indicating a start of data transmission by the N linked stations, only one station having a right to transmit data at a given time, the data transmitted by each station including a first portion for which real-time characteristics are required, and a second portion for which real-time characteristics are not required, each Mth station ($1<=M<=N$) comprising:

transmission means for transmitting a header signal to another station when the station including the transmission means is designated a master station, and for transmitting ones of both the first and second data portions to another station, receiver means for receiving a header signal and first and second data portions transmitted from another station, and control means, coupled to the transmission means and the receiver means, for assigning to the station including the control means the right to transmit data in a cycle period, wherein the cycle period is divided into 2N time slots, and wherein data is transmitted by the control means only in a first time slot constituting an Mth time slot, and a second time slot constituting an N+Mth time slot within the cycle period and for transmitting the first portion of the data separate from transmission of the second portion of the data, the first portion being transmitted by the transmission means in the first time slot and the second portion being transmitted by the transmission means in the second time slot, wherein the control means is able to transmit data only in the first and second time slots.

* * * * *